INVENTOR.
EDWARD E. BAUMAN
BY Brown, Jackson, Boettcher & Dienner

May 5, 1964 E. E. BAUMAN 3,132,211

DIAL LIGHT FOR TELEPHONE SUBSTATION SET

Filed June 13, 1960

3 Sheets-Sheet 2

INVENTOR.
EDWARD E. BAUMAN
BY Brown, Jackson, Boettcher & Dienner

INVENTOR.
EDWARD E. BAUMAN
BY Brown Jackson Boettcher & Dienner

United States Patent Office 3,132,211
Patented May 5, 1964

3,132,211
DIAL LIGHT FOR TELEPHONE SUBSTATION SET

Edward E. Bauman, Galion, Ohio, assignor to North Electric Company, Galion, Ohio, a corporation of Ohio
Filed June 13, 1960, Ser. No. 35,534
20 Claims. (Cl. 179—81)

Figure 1:
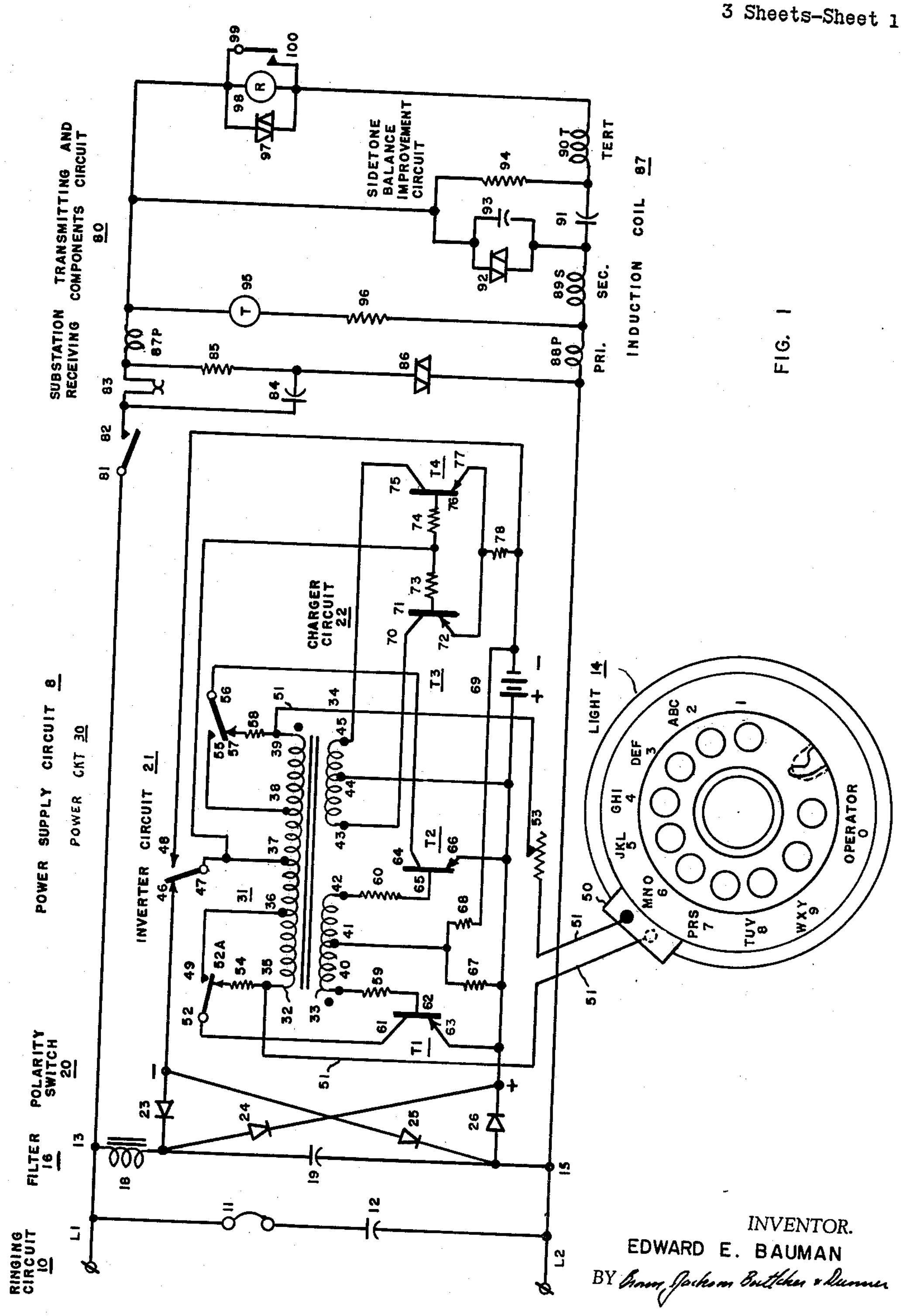

The present invention relates to a novel light-producing means adapted for use with a telephone system, and specifically to a novel generator circuit for energizing a solid-state, light-producing media from the direct-current power on a telephone line.

There has been an increasing display of interest in the field for a telephone substation set which has a light-producing means which provides an improved form of illumination for the telephone dial of a substation instrument, whereby use of the instrument in areas having a minimum of, or no illumination will be greatly facilitated. The earlier structures which were provided in the field in an attempt to satisfy such demands basically comprised means for mounting a lamp bulb adjacent the dial, and an extension cord for connecting such lamp to a 110 volt alternating current source. Such arrangement, in addition to being unsightly and subject to breakage, was of limited utility in that it required location of the phone in reasonable proximity to 110 voltage alternating current source outlet. Such arrangement is further undesirable in that it requires the connection of 110 volt alternating current power, with its attendant hazards, to the telephone substation set. In addition to these various shortcomings, the nature of the lighting which was provided by the bulb for the dial was still far from satisfactory.

More recent developments have resulted in the provision of a solid state electroluminescent lighting media which by reason of its thin, compact construction can be placed on the substation set beneath the indicia which identify the dial numerals, whereby an improved form of lighting is obtained, and the inherent problems experienced with vacuum bulbs, including breakage, heat and space, are eliminated. One particularly successful embodiment of such type lighting was set forth in the application of Edward E. Bauman and Willard A. Roberts, which was filed on January 4, 1960, and received Serial No. 194, and was assigned to the assignee of this application.

Such an arrangement, as noted, has constituted a definite step forward in the art of dial lighting for substation sets. However, the arrangement there disclosed still requires a 110 volt A.C. source, and the use of the device is at least partially restricted by such requirement. Further, as noted above, the connection of 110 volt A.C. source to a substation set is not considered particularly desirable in the field, in that it introduces a possible hazard to the telephone instrument user as well as to the service personnel who must maintain and install such units. There is a need, therefore, for a telephone substation set which includes means for energizing a light producing media from the direct-current power on the telephone line to which the substation set is connected, and it is a primary object of the present invention to provide a new and novel power source which is operative to generate such form of power without effecting an unreasonable drain on the line conductors. It is a particular object of the invention to provide a power source of such type which will energize an electroluminescent cell from the low voltage direct current power on the telephone line conductors.

One of the basic poblems inherent in the excitation of a solid state device from the power on the telephone line is the variable nature of the potential which occurs on the line conductors at the substation instrument. That is, the potential on the line conductors is normally in the order of forty-eight volts when the substation handset is restored on the substation base (the "on-hook" condition), and in the order of five to eleven volts when the handset is removed from the substation base (the "off-hook" condition). In certain types of commercially available telephone substation sets, the potential between the substation line conductors may even drop to zero volts when the "off-normal" contacts close during the movement of the dial preparatory to the transmission of the impulses, and as the dial pulsing contacts open and close thereafter in the transmission of the impulses, the line potential varies between zero and forty-eight volts respectively at the rate of ten pulses per second. The novel power source must therefore be capable of providing a steady energizing current during the periods when the power available on the direct current telephone line is at the following different levels: (*a*) "on-hook"—48 volts direct current at 750 microamps current; (*b*) "on-hook and ringing"—48 volts D.C. plus and minus 100 volts ringing voltage superimposed; (*c*) "off-hook"—five to eleven volts direct current at 20 milliamps maximum current; (*d*) "off-hook dialing"—voltage variations between zero and forty-eight volts at ten pulses per second; (*e*) reverse polarity which occurs as the result of extension of connections between exchanges.

It is a specific object of the present invention to provide a novel power circuit which, as energized from a variable potential source of such nature, is capable of providing a steady, substantially constant power output for the light-emitting media independent of variation in the supply potential for the circuit.

It is a further object of the present invention to provide a power source which is operable in such manner at a low order of current compared to known lighting devices as connected to the variable potential source of a conventional telephone line, whereby a large number of such devices may be coupled to the line without effecting heavy loading of the system.

It is still another object of the invention to provide a novel source means which is operative in such manner without resulting in noisy interference on the line, or varying the quality of communication transmission media which are effected over the line conductors, or adversely affecting signalling.

In certain uses and applications, in the home of the subscriber, it is frequently desirable that the light be somewhat soft so as not to be offensive when the unit is not in use, while yet providing a light of substantially increased intensity when the receiver is removed from the substation preparatory to a dialing operation, and it is a further object of the invention to provide a power source which is operative to automatically provide the different levels of power output in the different conditions of use of the substation set.

A particular feature of the invention is the manner in which the power source which is adapted to energize a solid state light material from the direct-current of the telephone line conductors permits the use of the arrangement in the illumination of other forms of display media in areas in which alternating current may not be readily available. That is, the novel source, in addition to being useful in illuminating the telephone dial, may be also used in the illumination of display media, such as instruction signs, advertising displays, signal lamps, telephone directory illuminating lights, and many other types of lighting media, without requiring the location of the display media adjacent a 110 volt alternating current source. Such arrangements are particularly adapted for use in roadside paystation booths which have been heretofore somewhat limited in use by reason of the absence of 110 volt A.C. source, or alternatively by reason of the expense involved in extending a 110 volt A.C. source to the booth at the location desired. The novel power supply circuit provides sufficient current to provide illumination for installations of such type, and therefore permits the use of such booths at a greatly increased number of field locations.

Figure 2:
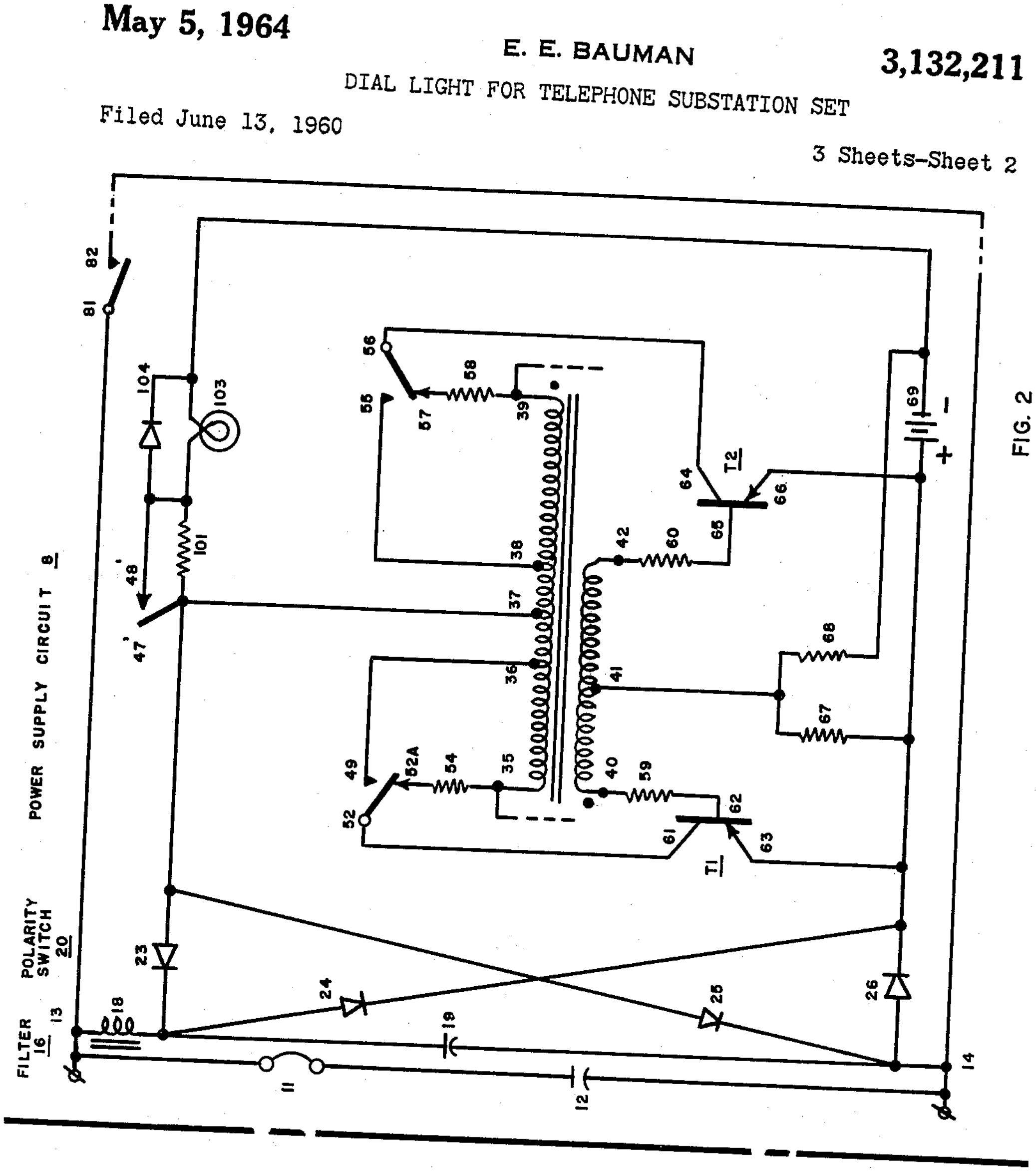
Figure 1A:
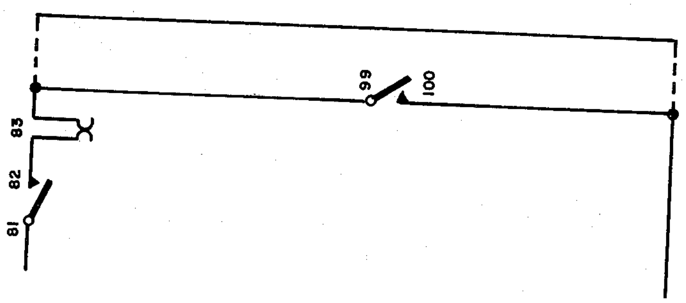
Figure 3:
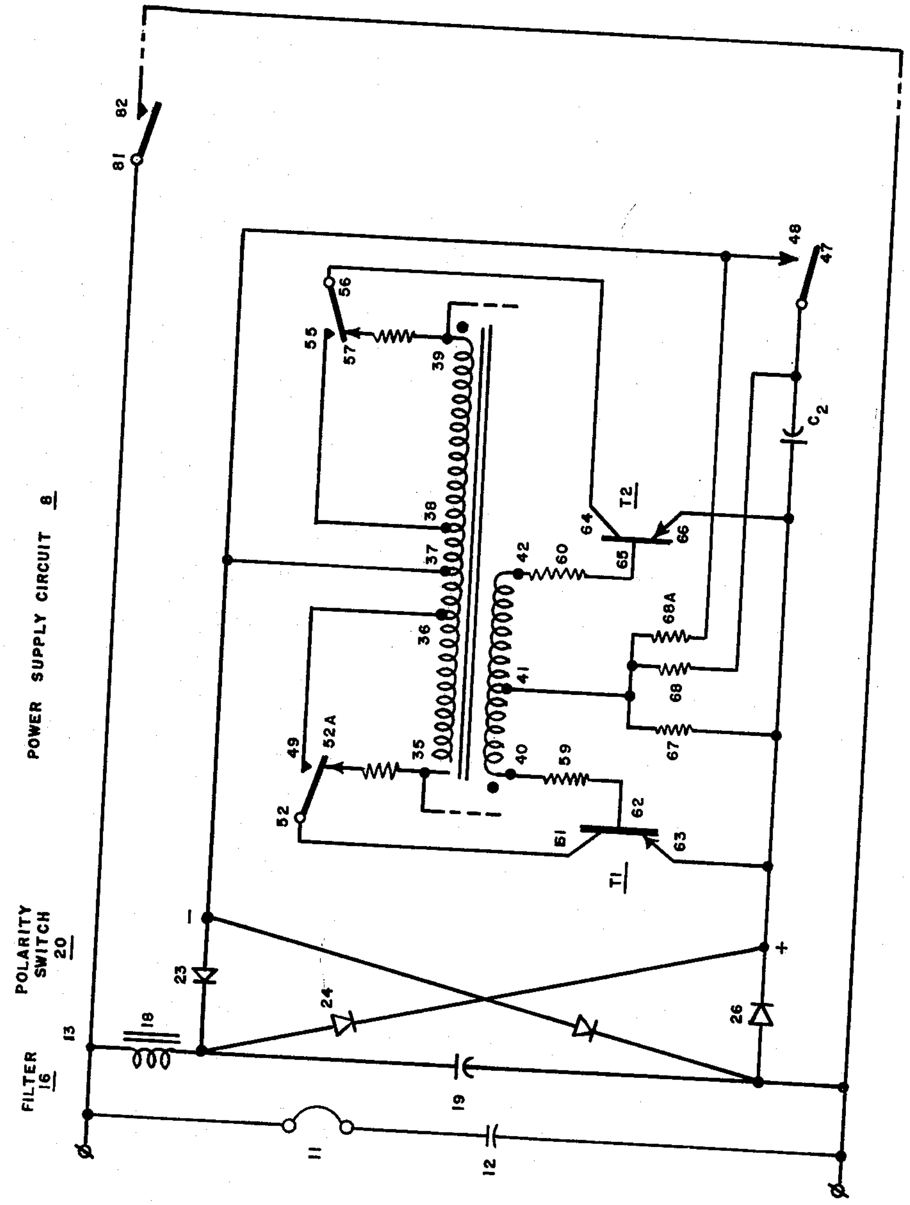

The foregoing objects, advantages and features of the invention will be apparent with the consideration of the following description and drawings which disclose the embodiments of the invention, and in which:

FIGURE 1 is a schematic illustration of the novel power supply circuit of the disclosure as connected to a telephone line to effect the energization of a solid state lighting device for the dial of one known form of substation set;

FIGURE 1*a* is a schematic showing of the modified circuitry of a second well-known form of commercially available telephone substation set with which the novel device is used; and FIGURES 2 and 3 are schematic showings for further novel embodiments of the power supply circuit for energizing a light-producing media.

*General Description*

The novel power energizing circuits of the invention are particularly adapted for use in energizing a light-emitting media for a dial on a telephone substation set, and in the disclosed embodiments, are operative to energize an electroluminescent light cell of the type set forth in the above identified patent to Bauman et al., wherein an annular electroluminescent cell is disposed beneath the indicia carrier member which is located about the periphery of the substation dial for the purpose of identifying the dial holes. The electroluminescent cell as energized by an alternating current source of power, provides a pleasant, soft light output for the dial, a particularly satisfactory light output having been experienced with the application of a power source thereto having a potential in the order of between 50 and 100 volts at a frequency of approximately 250 cycles.

The power circuits of the invention are basically comprised of solid state switching equipment including a transformer coil and semiconductor switching members which are mounted within the confines of the substation housing. The input terminals for the power circuit are connected to the subscriber line conductors and the circuit is energized by the direct-current potential thereon for at least the periods the substation is not in use. As shown hereinafter, the period of energization of the circuit by the direct-current line potential varies in different embodiments. In each arrangement, however, the power circuit is operative as thus energized to generate an alternating current potential for the electroluminescent cell.

According to one feature of the invention, the disclosed embodiments of the novel power circuit are operative to energize the electroluminescent cell to provide a light of a reduced intensity during the period that the receiver is on the substation base, or in the "on-hook" condition, and a light output of an increased value when the receiver is removed from the substation base, or in the "off-hook" condition, whereby a brighter light output is obtained during the period of dialling and a reduced output is provided when the substation is not in use.

*Power Supply With Charging Circuit for Battery Potential Storage Means*

With reference to FIGURE 1, a first embodiment of the novel power supply circuit 8 for a substation instrument includes input terminals 13, 15 for connecting the power supply circuit across the ringer circuit for the substation set, and across the subscriber line conductors L1, L2. Output terminals 35, 39 for the power supply circuit are connected over conductor pair 51 to the terminals 50 for an electroluminescent cell 14 which is mounted to illuminate the dial of a substation set as shown in the above-identified application.

Power supply circuit 8 basically comprises a filter circuit 16 which is operative to couple the direct-current on the line conductors L1, L2 over a polarity switch 20 to a power circuit 30. Filter circuit 16 is operative to block the ringing alternating current on the line from the power circuit 30, and the polarity switch 20 is connected to provide enabling potential to the power circuit 30 regardless of the polarity of the direct-current voltage on the line conductors L1, L2 respectively. That is, conductor L1 may be positive and conductor L2 may be negative, or alternatively conductor L1 may be negative and conductor L2 may be positive, and the polarity circuit 20 will in either event couple positive potential to the positive bus and negative potential to the negative bus for the power circuit 30.

The power circuit 30 which is energized by the potential on the positive and negative buses basically comprises a transistor inverter circuit 21 including an oscillator circuit for converting the direct-current voltage of the telephone line to an alternating current of a value which effects the energization of the electroluminescent cell 14 to provide the desired light intensity, the level of the light output being adjustable in different conditions of the substation instrument. That is, the output of the inverter circuit 21 as coupled to the electroluminescent cell 14 is controlled by the position of the hook switch on the telephone substation set, the hook switch including contact means which connect one set of windings in the oscillator circuit when the substation is not in use, and a second set of windings in the oscillator circuit when the hook switch is operated preparatory to a talking operation, whereby the signal output of the oscillator means and the light output of the electroluminescent cell is varied in a manner which results in a comparatively soft light during the "on-hook" condition and a light output of increased intensity when the receiver is in the "off-hook" condition. A resistor 53 controlled by a knob in the substation housing permits further adjustment of the light output of the cell by the subscriber in either condition.

The power circuit 30 also includes a potential storage means, such as a small nickel cadmium battery 69 in FIGURE 1, which is used to energize the inverter circuit 21 when the substation is in the "off-hook" condition, and a charging circuit, such as circuit 22 in FIGURE 1, which is energized by the potential on the line during "on-hook" condition to charge the potential storage device 69 of the power supply circuit. As shown in more detail hereinafter, the potential storage means 69 at certain times also provides a stabilizing potential for the inverter circuit 21 to control the inverter circuit in the provision of a constant signal output independent of variations in the direct-current potential on the telephone line conductors which is coupled to the inverter circuit.

*Specific Description*

With reference to FIGURE 1, the novel power supply circuit 8 includes a pair of input terminals 13, 15 for connecting the power supply circuit 8 and the ringer circuit 10 across the line conductors L1, L2 of the substation instrument. As shown thereat, a conventional ringer circuit 10 may comprise a ringer device 11 connected in series with capacitor 12 and bridged across line conductors L1, L2. The input terminals 13 and 15 for the power circuit 30 are connected to the line conductors L1, L2 in advance of the connections of the line conductors L1, L2 to the substation transmitter and receiver components 80. The substation components 80 are well known in the art, and are therefore only briefly identified hereat. As shown in FIGURE 1, the conventional components may include a set of switch hook contacts 81, 82 coupled to conductor L1, and a set of pulsing contacts 83, bridged by resistor 85 and capacitor 84, which are connected in series with rectifier diodes 86 to conductor L2, such circuit being primarily effective with opening and closing of dial contacts 83 responsive to moving of the dial by the subscriber to transmit pulses over the conductors L1, L2 at the rate of ten pulses per second.

An induction coil 87, including primary windings 87P, 88P, secondary winding 89S, and tertiary winding 90T, a sidetone balancing circuit, a transmitter element 95 and a receiver element 98 are also connected to the line conductors L1 and L2 in a conventional pattern. Briefly, primary winding 87P is connected to conductor L1, and primary winding 88P is connected to conductor L2, and transmitter 95 is connected in series with resistor 96 across the primary windings 87P, 88P. Receiver 98 which is shunted by rectifier 97 and off-normal contacts 99, 100, is connected between primary winding 87P and over tertiary winding 90T of inductance coil 87, capacitor 91, and the secondary winding 89S to the primary winding 88P of the induction coil 87. A sidetone balance circuit including rectifiers 92 and capacitor 93 connected in parallel with each other and resistor 94 are connected across capacitor 91 and to the primary winding 87P of inductance coil 87. The connection and operation of the substation transformer, receiver and inductance coil components are well known in the art, and further description thereof is not required.

The filter circuit 16 for the power supply circuit 8 comprises choke coil 18 and capacitor 19 connected in series between input terminals 13 and 15 which are connected to conductors L1, L2 respectively. Filter circuit 16 couples the direct current on the line conductors L1, L2 to the polarity switch 20 and blocks alternating currents on the line conductors L1, L2 from entering the polarity switch 20, the impedance choke 18 blocking alternating current from the switch 20, and the capacitor 12 shunting any small amounts of alternating current which may pass choke 18 to the opposite line conductor L2. The alternating current components on the conductors L1, L2 may, of course, be the conventional ringing voice currents or transients which normally occur on a subscriber telephone line.

In certain embodiments, it may be desirable to provide a visual display of incoming signals as well as (or in lieu of) the conventional audible ringing signals. Such arrangements are particularly useful to subscribers who may be hard of hearing, or to subscribers who may find the noise of the conventional ringing device objectionable. In such embodiments, it is only necessary to provide a coupling between the line conductors L1, L2 and the power supply circuit 8 which is sufficiently loose to permit the ringing signals to reach the power supply circuit 8. Such coupling is achieved by providing a choke 18 and capacitor 19 which are sufficiently low in value as to permit the leakage of such currents and thereby a variation of the potential supplied to the inverter circuit. Variation in the supply of the power to the inverter circuit 21 as a result of ringing current (100 volts + and −) being coupled to the substation in the "on-hook" condition, will result in a pulsating variation of the light intensity of the electroluminescent lamp 14, and thereby a visual signalling effect which indicates an incoming call.

Polarity switch 20 comprising rectifier diodes 23–26 is connected across capacitor 19 of the filter circuit 16, rectifier 24 being connected between the one side of the capacitor 19 and the positive bus (+) for the power circuit 30; rectifier 23 being connected in an oppositely poled manner between the one side of capacitor 19 and the negative bus (−) for the power circuit 30; rectifier 25 being connected between the negative bus and the second side of capacitor 19 with the polarity of rectifier 23; and rectifier 26 being connected between the second side of capacitor 19 and the positive bus with the polarity of rectifier 24. The output terminals of the polarity switch 20 provides a potential of the polarity indicated in FIGURE 1 to the positive and negative buses for the power circuit 30 regardless of the polarity of the direct current as coupled to conductors L1, L2. The polarity circuit thus permits the use of the power source with the telephone subscriber line regardless of the polarity of the telephone line conductors.

In the field, for example, the polarity of the telephone line conductors which are used in the extension of cells to different exchanges may vary. Further, in switchboards which use reverse battery supervision the polarity of the potential on the line conductor will be reversed during the extension of a connection. The polarity switch is included in the circuitry to provide common supply buses of fixed polarities for the power circuit independent of such variations, whereby changes and variations of the polarity of the line conductors will not affect the operation of the power circuit 30.

The power circuit 30 basically comprises inverter circuit 21, battery 69, battery charger circuit 22, hook switch contacts 46–48, 49, 52, 52A, 55–57, of the telephone substation set, and output terminals 35, 39 which are connected by conductors 51 to the input terminals 50 for the electroluminescent cell 14. Inverter circuit 21 basically comprises a transformer 31 having primary winding 32 and secondary windings 33, 34 and a pair of transistor members T1 and T2 which are coupled to the primary and secondary windings of transformer 31. Switch hook contacts 49–52, 55, 56 are operative to couple the transistor members T1, T2 to different segments of the transformer 31 to vary the output signals of the inverter circuit 21 in accordance with the on-hook, off-hook conditions of the telephone substation device, and also to vary the source of potential for the inverter circuit 21 with use of the substation instrument.

Primary winding 32 on transformer 31 includes taps 35–39, taps 35 and 39 being end taps, taps 36, 38 being intermediate taps, and tap 37 being a center tap for the primary winding. Secondary winding 33 includes taps 40–42, tap 41 being the center tap for the secondary winding 33; and secondary winding 34 includes taps 43–45, tap 44 being the center tap for secondary winding 44. The coil of the transformer 31 is of a square loop saturable material, such as is commercially available in the field as Hi Mu 80. The polarity of the windings is as indicated by the dots shown in the drawing adjacent thereto.

More specifically, transistor T1 comprises a collector element 61, a base element 62, and an emitter element 63, collector element 61 being connected over switch-hook contacts 52, 52*a*, resistor 54, the portion of the transformer primary winding 32 which extends between taps 35 and 37 and switch-hook contacts 47—46 to the negative supply bus of the polarity switch 20, it being apparent that with operation of the switch-hook to effect the opening of contacts 52, 52*a*, and the closure of contacts 49, 52, collector element 61 of transistor T1 will be connected to terminal 36 on the primary winding of transformer 31 to provide an increased signal output as described more fully hereinafter. Base 62 of transistor T1 is connected current limiting resistor 59, the portion of the secondary winding 33 which extends between taps 40, 41 to a voltage divider 67, 68 which is connected across a nickel-cadmium battery cell 69, the point of connection being such that the base 62 has a negative starting bias with respect to emitter 63 which is connected directly to the positive supply bus of the polarity switch 20.

Transistor T2 comprises a collector element 64, base element 65 and emitter element 66. Collector element 64 is connected over switch-hook elements 56, 57, and current limiting resistor 58 through the portion of the transformer primary winding 32 which extends between taps 39, 37 and over switch hook elements 47, 46 to the negative supply bus of polarity switch 20. With operation of the switch-hook to open contacts 56, 57 and close contacts 55, 56 the collector will be connected to tap 38 of the primary winding 32 to provide an increased signal output as more fully described hereinafter. Base 65 is connected over current limiting resistor 60 and the portion of the secondary winding 33 which extends between taps 42 and 41 to a common point of connection on voltage divider 67, 68 with the base 62 of transistor T1. Emitter 66 of transistor T2 is connected directly to the positive supply bus, whereby the connection of the base 65 to the more negative point on the voltage divider 67, 68 provides the base with the necessary negative bias with respect to the emitter 66.

The output of collectors 61, 64 of transistors T1, T2 respectively, is coupled over terminals 35, 39 and adjustable resistor 53 and contacts 51 to the terminal 50 for the electroluminescent cell 14. As shown hereinafter, with the substation not in use the inverter circuit 21 is operated by the direct-current battery potential on line conductors L1—L2 to provide an alternating current signal output to energize electroluminescent cell 14, and with the substation in use, the potential storage means 69 are connected to energize the inverter circuit 21 in the excitation of the electroluminescent cell 14.

A charging circuit 22 for potential storage means 69 is connected to the secondary winding 34 of transformer 31 for energization during the periods in which the telephone substation set is not in use (in the "on-hook" condition). During such periods as the substation is in use by the subscriber, the inverter circuit 21 and the charging circuit 22 are disconnected from the telephone line, and the battery is connected as a source of power for the inverter circuit 21.

More specifically, the charger circuit 22 comprises a pair of transistors T3, T4 which are connected in a controlled full wave rectifier circuit, the transistor T3 including collector element 70, base element 71, emitter element 72, and transistor 74 including collector element 75, base element 76 and emitter element 77, respectively. Collector element 70 of transistor T3 is connected over the portion of the secondary winding 34 which extends between taps 43, 44 to the positive bus, and collector 75 of transistor T4 is connected over the portion of the secondary winding 34 which extends between taps 45, 44 to the positive bus. Emitters 72, 77 of transistor T3, T4, respectively, are connected over a common resistor 78 to the negative terminal of potential storage means 69, and the base elements 71, 76, are connected over resistors 73, 74, respectively, to switch-hook contacts 47, 46 and the negative bus. In that the transistors T3, T4 are connected between the opposite ends of the secondary winding 43, 45 and the center tap 44, voltages of opposite polarity will be coupled to the collectors 71, 75 during alternate half cycles of the signal output of the inverter circuit, and the transistors will operate in the manner of a full wave rectifier to couple the charging circuit to the potential storage means 69. During the period that the substation is in the "off-hook" condition the connection as shown provides a bias at the junction of resistors 73, 74 which is connected over hook-switch contacts 47, 48 and returned over resistor 78 to the emitter of transistors T3, T4, whereby the transistors T3, T4 will not be conductive.

It is apparent that other forms of transistor switching arrangements may be used to complete the charging circuit for the potential storage means without departing from the spirit of the invention.

*Operation of Power Supply Circuit*

In operation, the novel power supply source effects excitation of the electroluminescent cell to provide a light output of a constant nature, the intensity of the light output being automatically varied for different conditions of use. That is, during the period that the substation is not in use, the switch-hook contacts are in the "on-hook" condition and the light is of a minimum intensity. With operation of the switch-hook contacts on the substation set preparatory to use by the subscriber, the intensity of the light output is substantially increased.

In more detail, with the switch-hook contacts in the "on-hook" condition (receiver on the substation set in structures of the type shown in the above-identified application), contacts 46, 47 are closed and contacts 47, 48 are opened, contacts 52, 52*a* and 56, 57 are closed, contacts 49, 52 and 55, 56 are opened, and contacts 81, 82 are opened. Assuming a conventional telephone system (and a small drop of potential which occurs across choke 18 and diodes 23–26), the voltage across the positive and negative buses for the inverter circuit 21 will be approximately 48 volts when the telephone substation is in the on-hook condition. In such condition, transistors T1 and T2 in inverter circuit 21 are energized by the 48 volt potential on the line conductors L1, L2 to provide an energizing potential over conductors 51 to the electroluminescent cell 14. With reference to the inverter circuit 21, emitter 63 of transistor T1 is directly connected to the common positive bus, and collector 61 is connected over switch-hook elements 52, 52*a*, current limiting resistor 54, to tap 35 and the portion of the transformer primary winding 32 which extends between taps 35, and 37, and switch-hook elements 47—46 to the negative bus, and the base 62 is connected over current limiting resistor 59 to tap 40, and the portion of the secondary winding 33 which extends between taps 40 and 41 to a point on the voltage divider 67, 68 which biasses the base 62 negative with respect to the emitter 63 to thereby provide an energizing circuit to transistor T1 therefor.

Transistor T2 of the inverter circuit 21 is biassed in a similar manner. That is, emitter 66 is connected to the positive bus; collector 64 is connected over contacts 56, 57, current limiting resistor 58 to tap 39, the portion of the transformer winding 32 which extends between the taps 39 and 37, and over switch hook contacts 47, 46 to the negative bus; and the base 65 of transistor T2 is connected over current limiting resistor 60 to tap 40 and the portion of the secondary winding 33 which extends between taps 42 and 41 to a point on the voltage divider 67, 68 which is negative with respect to the potential which is coupled to emitter 66.

It is apparent that with the telephone in the on-hook condition, emitters 63, 66 are positive with respect to the bases 62, 65 respectively, and the emitter-base paths are biassed in the forward direction and the collector-base paths are biassed in the reverse direction, whereby both transistors T1 and T2 are biassed for operation according to conventional common emitter configurations. In that the biasing of both transistors T1, T2 results in a bistable condition, in accordance with well-known operating concepts, one transistor of the pair will conduct before the second transistor, and the transistors T1 and T2 will conduct alternately to saturate the core of the transformer 31 first in one direction and then in the other direction, to thereby provide an essentially square wave output at terminals 35, 39 at approximately 300 cycles per second.

In more detail, as one of the transistors T1, T2 is energized (and assuming base 62 of transistor T1 is going negative), current will flow over the emitter collector path 63, 61, contacts 52, 52*a*, current limiting resistor 54, the winding between taps 35, 37 on transformer 31, and contacts 47, 46 to negative potential.

By regenerative action in transformer 31, the changing potential is coupled over the secondary winding 33 of transformer 31, and the portion of the changing potential which appears across taps 40, 41 drives the base 62 of transistor T1 almost instantaneously to its most negative potential relative to emitter 63 to control transistor T1 to conduct. The same transformer action effects coupling of a changing potential over the portion of the winding 41, 42 to the base 65 of transistor T2 to bias the base to its most positive potential relative to the emitter 66 to thereby drive transistor T2 to cut off. Such action occurs in an extremely short time interval, and results in a rapid switching period.

An increasing current now flows through the emitter-collector path 63, 61 of transistor T1 and the portion of the primary winding which extends between taps 35–37 during the period of conductivity of transistor T1 until the core of transformer 31 becomes saturated, whereupon a rapid current rise occurs in the portion of the winding which extends between taps 35, 37. As the emitter-collector current flow in transistor T1 exceeds the value which the base current times beta will permit as a result of the rapid current rise in the emitter-collector path, the transistor T1 is moved out of saturation and an abruptly increasing potential appears across emitter-collector path 63, 61 and an abruptly decreasing potential appears across the primary winding segment 35, 37. The resultant decrease in potential across the portion of the transformer winding 35, 37, by transformer action, results in an abruptly rising potential at base 62 of transistor T1, and an abruptly falling potential at base 65 of transistor T2.

As the potential of base 62 approaches the value of the potential of emitter 63, transistor T1 is cut off, and the base continues to become more positive to maintain the transistor in such state. Simultaneously, as the potential of the base 65 of transistor T2 becomes more negative than the emitter 66, transistor T2 conducts and current flows from the positive bus over the emitter-collector path 66, 64 of transistor T2 and over contacts 56, 57, current limiting resistor 58, the portion of the transformer winding 39, 37 and contacts 47, 46 to the negative supply bus.

The changing potential which appears in the winding 39, 37 results, by transformer action, in a changing potential in the secondary winding of the transformer 41, and the base 65 of transistor T2 is driven almost instantaneously to its most negative potential, and the base 62 of transistor T1 is driven almost instantaneously to its most positive potential. The first half cycle of the waveform output of the oscillator circuit has now been generated and the leading edge of the second half cycle has been initiated.

Thereupon, the increasing current flow through the emitter-collector path of transistor T2 and primary winding 39—37 of transmitter 31 continues until the core of transformer 31 becomes saturated in the reverse sense, and rapid current rise occurs in winding 39—37. Such action occurs during the period of generation of the second half cycle of the output waveform.

As the emitter-collector current of transistor T2 exceeds the value which the base current times beta will support as a result of the rapid current rise in transformer winding 39, 37, transistor T2 moves out of saturation and an abruptly increasing potential occurs across the emitter-collector path with a resultant decreasing potential across winding segment 39, 37. As a result of the changing potential in the primary winding of transformer 31, and the resultant change in potential in the secondary winding of transformer 31, base 62 of transistor T1 is driven negative and base 65 of transistor T2 is driven positive. As the potential of the base 65 approaches the value of the potential of the emitter 66, transistor T2 is driven to cutoff, and the base continues to become more positive. Simultaneously as the potential of the base 62 of transistor T1 becomes more negative than the emitter 63 transistor T1 conducts to initiate a subsequent cycle.

The alternate operation of the transistors as an oscillator continues in a repetitive manner to provide essentially square wave waveforms at 300 cycles per second and couples such output to taps 35 and 39 and over conductors 51 to the electroluminescent cell 14 to energize same in the illumination of the dial of the telephone instrument. A variable resistor 53 having an adjustable control (not shown) which extends to the exterior of the telephone substation housing permits manual adjustment of the alternating current in the output circuit of the inverter circuit 21 and thereby the intensity of the illumination provided by the electroluminescent cell 14.

During the period in which the receiver is restored on the substation base (on-hook condition), and the inverter circuit 21 is energized by the potential on the line conductors to provide the necessary power for illuminating electroluminescent cell 14, a potential storage means (rechargeable nickel-cadmium cell 69 in the illustrated embodiment) is subjected to a continual charging current by charger circuit 22. As shown in FIGURE 1, transistors T3 and T4 of charge circuit 22 are connected across the secondary winding 34 of transformer 31, and are energized in the manner of a full wave rectifier to provide a continuous supply of charging current to the battery cell 69.

More specifically, the base elements 71 and 76, respectively, are connected over resistors 73 and 74 and contacts 47, 46 to the negative bus; collectors 70 and 75 are connected over taps 43 and 45 respectively to the center tap 44 of the secondary winding 34 of transformer 31 to the common positive bus for the inverter circuit; and emitters 72, 77 are connected over resistor 78 to the negative terminal of the battery 69 which is negative relative to the common positive bus.

During the period of energization of inverter circuit 21 by the line potential (the on-hook condition), the square wave signal output of the inverter circuit also appears across the secondary winding 34 of transformer 31 and at the collectors 70, 75 of transistors T3, T4 which are connected to opposite ends of transformer winding 34. Voltages of opposite polarity will therefore appear at the collectors 70, 75 during successive half cycles of the inverter circuit. As the potential at tap 43 is negative, and the potential at tap 45 is positive, transistor T3 conducts and transistor T4 is cut off. During such half cycle, charging current is coupled to battery 69 over a path which extends from tap 44 over the common positive bus, battery 69, resistor 78, the emitter-collector path 72, 70 of transistor T3, and over a portion of the secondary winding which extends between taps 43 and 44, and to tap 44. As the potential at tap 45 becomes negative, and the potential tap 43 is positive during the next half cycle of the inverter signal output, transistor T4 conducts and transistor T3 is cut off. During such half cycle, battery 69 is charged over the path which extends from tap 44 to the common bus, and over battery 69, resistor 78 and the emitter collector path 77, 75 of transistor T4 to tap 45, and the portion of the secondary winding which extends from tap 45 to tap 44. The battery being of the nickel-cadmium type cannot be overcharged, and automatically terminates the charging operation as its full capacity is reached.

It will be apparent that with the load of the battery charging circuit 22 on the transformer 31 during the on-hook condition of the substation (when the substation is not in use), the resultant load of the battery charger will assists in the reduction of the intensity of the light output of cell 14. Current limiting resistors 54, 58 in the output circuits of the oscillator transistors T1, T2 in addition to preventing transistors T1, T2 from drawing too much current, are also operative to effect a reduction in the power coupled to the electroluminescent cell, and thereby a reduction in the light intensity.

*Operation of Power Circuit With Substation in Off-Hook Condition*

As indicated heretofore, as the subscriber effects operation of the substation hook-switch preparatory to dialing the subscriber (or answering an incoming call), the intensity of the light output of the electroluminescent cell is increased to provide a brighter source of illumination for the dial.

As the hook-switch contacts are operated in such manner, contacts 46, 47 are opened and contacts 47, 48 are closed; contacts 52, 52a are opened and contacts 52, 49 are closed; contacts 57, 56 are opened and contacts 56, 55 are closed, and contacts 81, 82 are closed.

As contacts 81, 82 are closed, a direct-current loop is extended from conductor L1 over various paths in the operating elements of the substation set (transmitter 95, receiver 98, sidetone balancing circuit 92, 93, 94, induction coil 87, dial contacts 83, etc.), to the line conductor L2. The voltage across conductors L1, L2 at the substation at such time in certain installations will drop to a value of between 5–11 volts, the value of the voltage being variable with the resistance of the telephone line from the central office and other installation criteria. Thus, with the removal of the handset from the substation base, the available voltage is reduced from 48 volts to 5–11 volts. However, it is at this time that an increased power output is required of the inverter circuit 21.

Switch-hook contacts 46, 47, as now opened, interrupt the connection of the inverter circuit 21 to the line conductors L1, L2, and switch-hook contacts 48, 47, as now closed, couple the inverter circuit 21 to the battery 69, the switch-hook contacts 47, 48 connecting the center tap 37 on transformer 31 to the negative terminal of battery 69. The emitter circuits 63, 66 are connected as the positive terminal of battery 68.

Simultaneously switch-hook contacts 52, 52a, open to interrupt the connection of the collector 61 of transistor T1 to transformer tap 35, and contacts 52, 49 close to connect the collector 61 to transformer tap 36. In a similar manner switch-hook contacts 56, 57 open to interrupt the connection of collector 64 of transistor T2 to transformer tap 39, and contacts 55, 56 close to connect collector 64 of transistor T2 to tap 38 of transformer 31. Taps 36 and 38 are located at a point on the primary winding 32 of transformer 31 to effect a substantial increase in the power output of the transistors T1, T2 to the electroluminescent cell 14. The change of the connection of the collectors 61, 64 to taps 36, 38 in lieu of taps 35, 39 also increases the volts/turn ratio, and thereby the frequency output of the oscillator circuit to increase the light output of the electroluminescent cell. The voltage between the terminals 35 and 36 and also between terminals 38 and 39 is now effected by auto-transformer action.

It will be apparent that with contacts 46, 47 open the inverter circuit is completely disconnected from the line conductors L1, L2 so that the 300 cycle output of inverter 21 cannot be coupled over the line conductors to the receiver 98 of the substation unit during talking.

Transistors T1, T2 oscillate in the inverter circuit 21 in the manner of the previous description. The supply voltage coupled to tap 37 by battery 69 however is of a substantially lower value than the voltage coupled thereto when the inverter circuit is connected to line conductors L1, L2. That is, as contacts 46, 47 open, and contacts 47, 48 close, the transformer primary winding tap 37 is transferred from the line conductors (48 volts negative) to the negative terminal of battery 69 (3.5 volts negative), and the base elements 71 and 76 for transistors T3, T4 are also simultaneously switched from the 48 volt negative bus to the 3.5 volt negative terminal of battery 69. Additionally, transformer turns 36, 37 are now connected in the collector circuit of transistor T1, and transformer turns 37, 38 are now connected in the collector circuit of transistor T2. In that collectors 61, 64 of transistors T1, T2 are operating at a lower value, voltage current limiting resistors, such as 54, 58 are not required.

With the bases and emitters of transistors T3, T4 in charging circuit 22 at essentially the same potential, transistors T3 and T4 are biased to cut off, and a high resistance obtains in the emitter-collector paths thereof to prevent the battery from drawing charging current over secondary winding 34 during the period that the inverter circuit 21 is energized by the battery source.

A further feature of the novel power supply circuit is the manner in which the connection of substation sets including the power supply to a party line are operative to provide a visual signal to the subscribers on the line which indicate that the line is in use. That is, in the event that one of the subscribers on the party places the line in use by operating the hook-switch contacts preparatory to the establishment of an outgoing call or alternatively in answering an incoming call, the battery voltage across the line conductors L1, L2 will be reduced from the normal "on-hook" value of forty-eight volts to the "off-hook" value of five-eleven volts. In that such value of voltage is insufficient to maintain the inverter circuits 21 operative in each of the other substations which are connected to the same party line (and which are in the "on-hook" condition), the power output of the inverter circuit 21 at the substations on the party line which are not in use will be reduced sufficiently to extinguish the electroluminescent cells thereat and thereby indicate to the other subscribers on the party line that the line is in use. Such arrangement permits the provision and use of party line installations without the normal aggravations which occur when parties desiring to use the line must necessarily first "listen in" to ascertain if the line is in use, and must repeatedly thereafter "listen in" to determine if the parties using the line have completed their conversation. Such source of annoyance to both the users of the line and the subscriber awaiting the opportunity to use the line is thereby avoided.

*Specific Circuit Arrangement*

In one particularly successful embodiment, a representative set of values for the components of the polarity switch, inverter circuit, battery charger, and battery are as follows:

| | |
|---|---|
| Diodes 23, 24, 25, 26 | IN 2069 silicon. |
| Resistors 54 and 58 | 27,000 ohms. |
| Resistors 59 and 60 | 1,000 ohms. |
| Resistor 67 | 1,500 ohms. |
| Resistor 68 | 68,000 ohms. |
| Resistor 78 | 220 ohms. |
| Resistors 73 and 74 | 1,500,000 ohms. |
| Rheostat | 1,000,000 ohms. |
| Transistors T1 and T2 | RCA 2N398. |
| Transistors T3 and T4 | 2N1375. |

Transformer:
EI laminations identified as 187 by the trade, of Hi Mu material
Turns between taps—
35–36=2670 turns of #43 enamel wire
36–37=220 turns of #43 enamel wire
37–38=220 turns of #43 enamel wire
38–39=2670 turns of #43 enamel wire
40–41=150 turns of #43 enamel wire
41–42=150 turns of #43 enamel wire
43–44=500 turns of #43 enamel wire
44–45=500 turns of #43 enamel wire Condenser 22—10 mfd. nonpolarized
Filter choke 21—23 henries
Battery 69—nickel-cadmium battery—150 ma. hours ratting—3 cells at 1.35 volts The above identified values are representative of the components utilized in a ubstation set in which the line conductor potential is at 48 volts when the substation set is in the on-hook condition; the line conductor potential is 5–11 volts in the off-hook condition, and the voltage during dialing may drop to zero volts. Manifestly, if the device is used in installations in which these values differ materially, corresponding changes in the values of at least certain of the components will be effected.

*Power Supply Circuit for Charging Potential Storage Means During Off-Hook Condition*

A further embodiment of the novel power supply circuit 8 is shown in FIGURE 2, the portions of the circuit of FIGURE 1 which are similar not being shown in detail to simplify the description of the features of the embodiment shown in FIGURE 2.

As there shown, the power supply circuit 8 includes a more simplified form of charging circuit for the potential storage means 69, the charging circuit including a base-bias resistor 101, a series connected lamp 103, a rectifier 104 connected in parallel with lamp 103, and a pair of switch-hook contacts 47′ and 48′ for connecting charging current of different magnitudes to the potential source means. Switch-hook contacts 47′ and 48′ are open when the substation is in the on-hook condition, and are closed when the substation is in the off-hook condition, the different conditions of operation effecting the completion of different charging currents between the negative buses for the power supply circuit 8 and the negative terminal of the potential supply source 69. It is apparent that such arrangement eliminates the need for a second winding on transformer 31, and a charging circuit having switching components such as transistors T3 and T4 in FIGURE 1.

When the substation is not in use (on-hook condition) and a 48 volt potential is connected to the line conductors L1, L2, a trickle charge is coupled to battery cell 69 over a path which extends from the negative bus over resistor 101, lamp 103 and battery 69 to the positive bus for the power supply circuit 8 to compensate for the base-bias current which is being drawn by the oscillator circuit. The power supply circuit otherwise operates in the manner of the arrangement shown in FIGURE 1.

As the subscriber prepares to use the substation, and the substation is placed in the off-hook condition, the switch hook contacts 47, 48 are closed, and the potential on the conductors L1, L2 is coupled over switch-hook contacts 47, 48 and lamp 103 to the potential supply source 69 to provide a charging current of a substantially increased value thereto. Lamp 103 in the charging circuit operates as a current regulator, and the constant voltage of battery 69 prevents the voltage across the windings 36, 37, 37, 38 from increasing to an amplitude of unreasonable value.

During the dialing operation (at which time the potential in circuit of some telephone substation sets may drop to zero volts [see FIGURE 1*a*]), the battery 69 will be operative to couple an energizing potential to the inverter circuit 21 to maintain the output thereof constant, even though the supply potential which is normally coupled thereto by the line conductors has dropped to zero volts. The energizing circuit for the inverter circuit 21 now extends from the negative terminal of battery 69 over rectifier 104 (which is conductive by reason of the fact that the negative terminal is now 3½ volts more negative than the negative bus which is at zero volts) and over switch circuit contacts 47, 48 to the center tap 37 to the primary winding of transformer 31 and the energizing circuit for the inverter circuit 21 as set forth in the description relating to the arrangement of FIGURE 1. Diode 23 prevents the low voltage on the line conductor from resulting in a dead short for the battery 69.

As the dial contacts open, the line voltage alternates between 148 volts direct-current at 10 cycles per second rate and the series impedance of the choke 18, the shunt action of the capacitor 12, the series drop of lamp 103 and the low impedance of battery 69 cooperate to prevent the development of an increased voltage across windings 36—37 and 37—38 during dialing operation.

In brief summary, the potential source means 69 in the embodiment of FIGURE 2 is charged by a trickle charge during the periods in which the substation is not in use, and a charging circuit of increased magnitude is coupled thereto during operation of the substation to the off-hook condition. Moreover, the inverter circuit 21 is not disconnected from the line when the substation is operated to the off-hook condition, and potential source means 69 are operative to maintain a constant potential supply to the inverter circuit 21 in the event that the potential on the line conductors L1 and L2 should drop below the normal value coupled to the inverter circuit 21 during dialing.

*Power Supply Circuit With Capacitor Potential Storage Means*

A further novel embodiment of the invention is set forth in FIGURE 3, which differs primarily from the arrangement of FIGURE 1 in the use of a capacitor C2 in lieu of battery cell 69. In such arrangement, capacitor C2 is normally connected across the voltage divider including resistors 67, 68 when the substation is in the on-hook condition (not in use). Switch-hook contacts 47, 48 are open with the substation in such condition, and the condenser 62 is therefore not normally connected across conductors L1, L2.

With operation of the substation to the off-hook condition, contacts 47, 48 close and capacitor C2 is connected across the negative and positive buses for the power supply circuit 8, and also also across the voltage divider including resistance 67, 68, 68*a*.

When the substation is in the on-hook condition, the inverter circuit 21 is energized by the power of the positive and negative buses, the positive bus being connected to the emitter elements for the transistors T1, T2 and to one end of the voltage divider as comprised of resistances 67, 68. The negative bias for the emitter base elements of the transistors T1, T2 is obtained by reason of the connection of the resistances 67—68A of the voltage divider between the positive and negative buses for the power supply circuit 8. The inverter circuit 21 is operative in the manner set forth in the description above relative to the inverter circuit 21 in FIGURE 1.

With operation of the substation set to the off-hook condition, switch-hook contacts 47 and 48 close to complete a charging circuit for capacitor C2 which extends from the negative bus over contacts 47, 48 and capacitor C2 to the positive bus. The emitter-base is now biassed from the negative source over resistors 68 and 68A, connected in parallel, and resistor 67 to the positive bus.

During the dialing operation, the capacitor C2 couples current over switch contacts 47—48 to the center tap 37 for the primary winding of transformer 31 to supplement the potential which is coupled thereto by the line conductors L1, L2, whereby a constant value potential is maintained in the supply circuit for the inverter circuit 21, regardless of the condition of operation of the substation set.

The long time constant provided by the choke 18, and capacitor 19 and capacitor C2 in parallel maintains the voltage across the winding at a constant value when the dial contacts are opened and close at the dialling rate.

The embodiment of FIGURE 3 utilizes fewer operating components including a reduced number of switch-hook contacts, and is therefore a less complex and less expensive arrangement.

Although only a particular embodiment of the invention has been shown and described, it is apparent that modifications and alterations may be made therein, and it is intended in the appended claims to cover all such modifications and alterations as may fall within the true spirit and scope of the invention.

What is claimed is:

1. In a power supply circuit adapted to be coupled to the voice communication lines extending from an exchange to a subscriber substation set in a telephone system to provide an alternating current signal output to an electroluminescent cell for said subscriber substation set comprising input means for coupling the power supply circuit to said voice communication lines, an inverter circuit coupled to said input means including oscillator means operative responsive to the low voltage, direct-current power on said voice communication lines to generate alternating current output signals of a value to energize said electroluminescent cell, and output means for coupling said alternating current signals to said electroluminescent cell.

2. In a power supply circuit adapted to be coupled to a direct-current source in a telephone system to provide an alternating current signal output to an electroluminescent cell comprising input means for coupling the power supply circuit to the direct-current conductors of a telephone line, an inverter circuit coupled to said input means operative to generate alternating current output signals of a value to energize said electroluminescent cell, output means for coupling said alternating current signals to said electroluminescent cell, and potential storage means in said power supply circuit for supplying auxiliary power for energizing said inverter circuit for at least certain periods of operation of said inverter.

3. In a power supply circuit for use in a telephone substation set adapted to be coupled to the line conductors in a telephone system to provide an alternating current signal output for energizing an electroluminescent cell on the substation set comprising input means for coupling the power supply circuit to said line conductors, an inverter circuit coupled to said input means operative to generate alternating current output signals of a value to energize said electroluminescent cell, output means for coupling said alternating current signals to said electroluminescent cell, and switching means controlled by the switch-hook on said substation set in one position to reduce the power output of said inverter circuit and in a second position to increase the power output of said inverter circuit to correspondingly vary the intensity of the light output of said cell.

4. A power supply circuit as set forth in claim 2 in which said input means includes a filter circuit connected between said line conductor and said inverter circuit to block the passage of alternating current components on the line conductors from said inverter circuit.

5. A power supply circuit as set forth in claim 2 in which said input means includes a first and a second input conductor for said inverter circuit, and a polarity switch including a rectifier bridge connected to the line conductors to connect potential of one polarity to said first conductor and a polarity of a second potential to the second conductor independent of the nature of the connection of the two polarities to the line conductors.

6. In a power supply circuit adapted to be coupled to a direct current source in a telephone system to provide an alternating current signal output to an electroluminescent cell comprising input means for coupling the power supply circuit to the conductors of a direct current telephone line, an inverter circuit coupled to said input means operative to generate alternating current output signals of a value to energize said electroluminescent cell, including an oscillator circuit including a first and a second semiconductor device, each of which has an output circuit and at least one element connected to its output circuit, a transformer member including a center tapped primary winding including means for connecting the center tap to one side of said source, and a center tapped secondary winding means connecting the center tap of the secondary winding to the other side of said source and the output circuits of different ones of said semiconductors to different sides of said center tap on said secondary winding, multiposition switch means operative in different positions to connect different sections of said primary winding having a different turns/volts ratio in the output circuits of said semiconductor devices, means for connecting a control element of each of said semiconductor devices to said secondary winding, the control elements of the different semiconductors being connected to opposite sides of the center tap of the secondary winding, and means for coupling a further element of each semiconductor to said other side of said potential source to control the semiconductor devices to operate as an oscillator circuit; and output means for coupling the alternating current signal output of said oscillator circuit to said electroluminescent cell.

7. In a power supply circuit adapted to be coupled to a direct-current source in a telephone system to provide an alternating current signal output to an electroluminescent cell comprising input means for coupling the power supply circuit to the direct-current conductors of a telephone line, an inverter circuit coupled to said input means operative to generate alternating current output signals of a value to energize said electroluminescent cell, output means for coupling said alternating current signals to said electroluminescent cell, potential storage means for supplying auxiliary power to said inverter circuit, charging circuit means for said potential storage means, and means for conducting a potential obtained from said line conductors to said charging circuit means for said storage means.

8. A power supply circuit as set forth in claim 7 in which said potential storage means comprises a battery cell.

9. A power supply circuit as set forth in claim 7 in which said potential storage means comprises a capacitor device.

10. A power supply circuit as set forth in claim 7 in which said charging circuit means includes at least one semiconductor device, means for connecting said semiconductor in circuit with the potential storage means, and means for connecting a charging potential obtained from said source over said semiconductor device to said potential storage means.

11. In a power supply circuit for use in a telephone substation set adapted to be coupled to the line conductors in a telephone system to provide an alternating current signal output to an electroluminescent cell on the substation set comprising input means for coupling the power supply circuit to said line conductors, an inverter circuit coupled to said input means operative to generate alternating current output signals of a value to energize said electroluminescent cell, output means for coupling said alternating current signals to said electroluminescent cell, potential storage means in said power supply circuit for supplying auxiliary power to said inverter circuit, a charging circuit for said potential storage means, and multiposition switching means on said substation set operative in movement to one position to connect said charging circuit for energization by potential obtained from said line conductors, and operative in movement to a second position to interrupt the connection for the charging circuit.

12. In a power supply circuit for use in a telephone substation instrument adapted to be coupled to the line conductors in a telephone system to provide an alternating current signal output to an electroluminescent cell on the substation instrument comprising input means for coupling the power supply circuit to said line conductors, an inverter circuit coupled to said input means operative to generate alternating current output signals of a value to energize said electroluminescent cell, output means for coupling said alternating current signals to said electroluminescent cell, and potential storage means in said power supply circuit for supplying auxiliary power to said inverter circuit, a charging circuit for said potential storage means, and multiposition switching means on said substation set operative in one position to connect a charging potential obtained from said line conductors to said charging circuit and said potential storage means, and operative in a second position to connect said potential storage means to energize said inverter circuit.

13. A power supply circuit as set forth in claim 12 in which said multiposition switching means includes contact means controlled by the switch-hook on said substation means, said switch-hook controling said contacts to connect said potential storage means to said inverter circuit responsive to operation of the switch-hook preparatory to use of the substation instrument, and to connect said charging potentials to said potential storage means responsive to operation of said switch-hook subsequent to use of the substation instrument.

14. A power supply circuit as set forth in claim 12 in which said multiposition switching means includes contact means operative with said switch-hook means in said one position to control said inverter means to operate to provide a first power output, and operative in said second position to control said inverter means to operate to provide a power output of a greater value than said first power output.

15. In a power supply circuit adapted to be coupled to a low voltage direct current source in a telephone system to provide an alternating current signal output to an electroluminescent cell for a subscriber substation set comprising input means for coupling the power supply circuit to the direct-current conductors of a telephone line, an inverter circuit in said substation set coupled to said input means operative responsive to said low voltage, direct-current power of the telephone system to generate alternating current output signals of a value to energize said electroluminescent cell, output means for coupling said alternating current signals to said electroluminescent cell, and control means in said power supply circuit adjustable to different positions by the subscriber operative in the different positions to vary the value of the output signals coupled to the electroluminescent cell by said inverter circuit, to thereby permit adjustment of the intensity of the electroluminescent cell illumination to correspondingly different values.

16. In a power supply circuit adapted to be coupled to the low voltage, direct current subscriber line conductors in a telephone system to provide an alternating current signal output to energize a light producing media for a telephone substation set comprising input means for coupling the power supply circuit to the line conductors of a telephone line, signal generator means including an inverter circuit housed within said substation set coupled to said input means operative responsive to said low voltage, direct-current potential on said subscriber line conductors of the telephone system to generate alternating current output signals of a predetermined frequency range, a light producing media operative responsive to the coupling of alternating current signals of said frequency range thereto, and output means for coupling said alternating current signals to said light-producing media.

17. In a power supply circuit adapted to be coupled to direct current line conductors in a telephone system to provide an alternating current signal output to energize a light producing media for a telephone substation set comprising input means for coupling the power supply circuit to the line conductors of a telephone line, signal generator means including an inverter circuit for said substation set coupled to said input means operative responsive to said direct-current on said line conductors to generate alternating current output signals of a value to energize said light-producing media, output means for coupling said alternating current signals to said light-producing media, and potential storage means in said power supply circuit operative to supply auxiliary power to said inverter circuit to maintain the signal output of said inverter circuit at predetermined desired values substantially independent of changes of potential on said line conductors.

18. In a power supply circuit adapted to be coupled to the direct current line conductors in a telephone system to provide power for energizing a light producing media in a substation set comprising input means for coupling the power supply circuit to the direct-current line conductors of the telephone line, signal generator means coupled to said input means operative responsive to said direct current on said line conductors to generate alternating current output signals of a value to energize said light-producing media to provide illumination for said substation set, output means for coupling said output signals to said light-producing media, and potential storage means connected in said power supply circuit to supply auxiliary power to said signal generator means at least at certain periods of operation of said signal generator means to maintain the signal output thereof at predetermined desired values substantially independent of variation of the direct current potential on said line conductors.

19. In a power supply circuit adapted to be coupled to the direct-current line conductors in a telephone system to provide an alternating-current signal output to a light-emitting media comprising input means for coupling the power supply circuit to said direct-current line conductors including means operative to couple at least a portion of the ringing currents to said power supply circuit, said power supply circuit comprising signal generator means including inverter means coupled to said input means operatively controlled by said direct-current power to generate alternating current output signals, the value of the output signals varying in response to the variations of the value of the ringing current on the line, and output means for coupling said varying alternating current signals to said light-emitting media to provide a pulsating light output by said media as a visual indication of the receipt of ringing signals over the line conductors.

20. In a power supply circuit for a substation set adapted to be coupled to a set of direct current line conductors in a telephone system including party lines to provide an alternating current signal output to energize a light producing media for its substation set, each set of line conductors having a potential of a first value thereon whenever the set of line conductors are not in use, and a potential of a second value whenever a subscriber connected to the line conductor seizes the line for use, said power supply circuit comprising input means for coupling the power supply circuit to a set of line conductors, signal generator means coupled to said input means operatively controlled by the direct current potential of said first value on said line conductor to generate alternating current output signals of a value to energize said light-producing means, and being non-operative responsive to said potential of said second value on said line to generate signals of a value to energize said light-producing media whereby in the connection of the substation sets to a party line the use of the party line by a subscriber thereon effects extinguishment of the light-producing media at each of the other substations which are connected thereto.

References Cited in the file of this patent

UNITED STATES PATENTS

| | | |
|---|---|---|
| 1,864,646 | Edwards | June 28, 1932 |
| 2,061,227 | Edwards | June 28, 1936 |
| 2,278,504 | Wingardner | Apr. 7, 1942 |
| 2,392,321 | Hersey | Jan. 8, 1946 |
| 2,573,617 | Shann | Oct. 30, 1951 |
| 2,908,806 | Cohen | Oct. 13, 1959 |
| 2,920,259 | Light | Jan. 5, 1960 |
| 2,937,298 | Putkovich et al. | May 17, 1960 |